United States Patent [19]

Moore

[11] 4,054,007

[45] Oct. 18, 1977

[54] ROW-CROP TILLAGE AND TREATING DEVICE

[75] Inventor: John O. Moore, Helena, Ark.

[73] Assignee: Sprayrite Manufacturing Company, Helena, Ark.

[21] Appl. No.: 677,449

[22] Filed: Apr. 15, 1976

[51] Int. Cl.² ............................................. A01C 23/04
[52] U.S. Cl. ........................................... 47/1.7; 111/6
[58] Field of Search .................... 47/1.7, 1.5, DIG. 10; 111/6, 7, 52; 172/307, 484; 239/288.5

[56] References Cited

U.S. PATENT DOCUMENTS

| 2,663,973 | 12/1953 | White | 47/1 |
| 2,691,353 | 10/1954 | Secundo | 111/52 |
| 2,734,439 | 2/1956 | Padrick | 111/52 |
| 2,754,622 | 7/1956 | Rohnert | 111/6 |
| 3,327,786 | 6/1967 | Meyer | 111/6 |
| 3,357,646 | 12/1967 | Meyer | 47/1.7 |

*Primary Examiner*—Richard J. Johnson
*Attorney, Agent, or Firm*—Hill, Gross, Simpson, Van Santen, Steadman, Chiara & Simpson

[57] ABSTRACT

An apparatus for controlling weeds and for treating crops planted in rows has a horizontal frame connected to a transverse, horizontal tool bar of a propelling vehicle by a parallelogram linkage which is maintained in gauged vertical relation to a crop row shoulder surface by a pair of gauge wheels affixed to the frame and rolling along the shoulder surface. A pair of disc blades which may be rotatable if desired are adjustably carried along either side of the crop row shoulder by shafts mounted in the clamps on the frame, the clamps permitting vertical, lateral, and angular positioning of the shafts and disc blades. A pair of spray nozzles may be carried from the rear end of the frame for positioning on either side of the crop row for application of herbicides and other chemicals.

10 Claims, 4 Drawing Figures

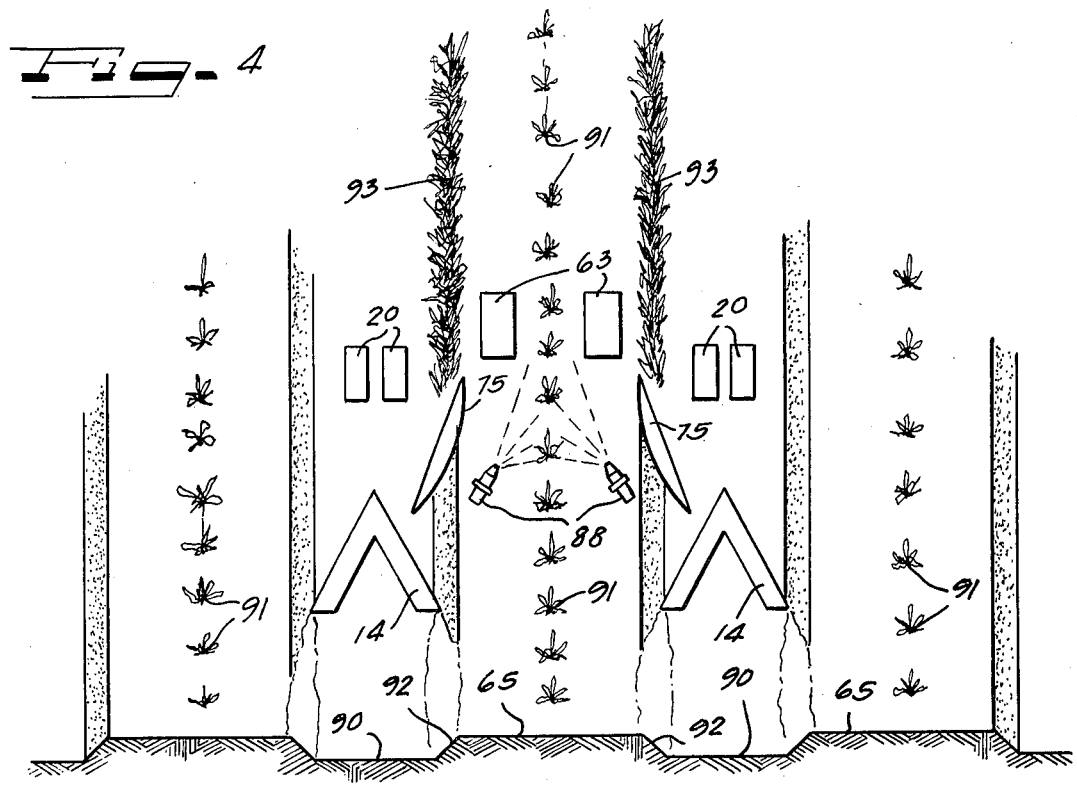
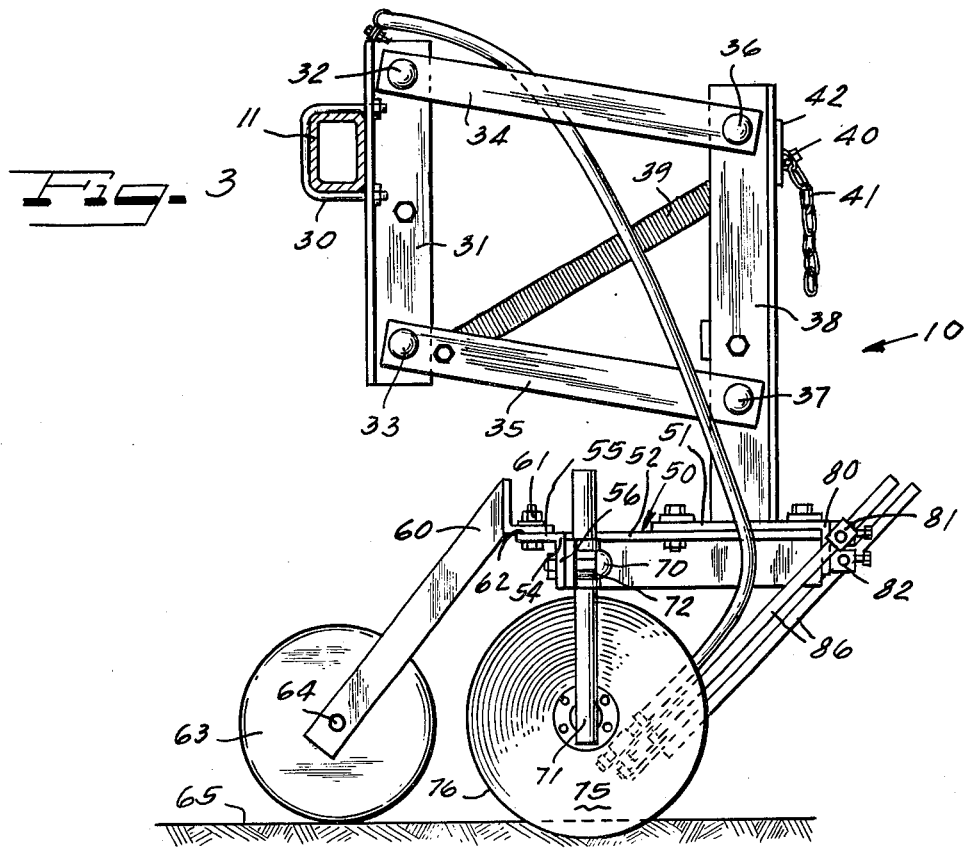

ically at 10 in FIG. 1 mounted upon a tool bar 11 behind
ROW-CROP TILLAGE AND TREATING DEVICE

BACKGROUND OF THE INVENTION

1. Field of the Invention

The present invention relates to tillage, treating, and cultivating devices for row crops.

2. The Prior Art

Where premerge chemicals are applied at planting time to row crops to form a sterile band alongside the plants, it is often desirable after emergence of the crops to again treat the fields where the crops are growing. Depending upon crop, weed, and soil conditions, a farmer may desire selectively to treat the field along the crop rows without disturbing the band, or he may add chemicals to the bands to destroy weeds growing therein, or he may cultivate and destroy the band together with the weeds growing therein but without uprooting the crop, or he may wish to defend the band margins from encroachment by weeds. Prior utilization of cultivation discs for these purposes required mounting of the discs onto a cultivator unit at a location normally reserved for a cultivation sweep. The gauge wheel for the sweep was positioned other than alongside the crop rows, making positioning of the laterally-extended discs somewhat independent of ground contours at the crop rows. Poor lateral spacing and tracking of the discs in relation to the crop row was also experienced because of lateral shifting of the cultivating unit caused by variable side pressures exerted on the discs.

SUMMARY OF THE INVENTION

The device of the present invention is adapted to travel along and to treat individual crop rows independently of cultivation units mounted alongside to treat spaces between the crop rows. The tillage assembly and the cultivator units are maintained in predetermined lateral spacing by a common implement tool bar. A pair of laterally spaced gauge wheels and a corresponding pair of disc blades are positioned to straddle the crop row upon a frame which is vertically gauged by the wheels. An adjustable tension spring is provided to maintain continuous down pressure upon the gauge wheels through a parallelogram arrangement connecting the frame to the tool bar, preventing possible bouncing of the tillage device. The gauge wheels ride upon a ground surface on flat shoulder zones 4 to 8 inches wide on either side of a crop row. A supporting and adjusting bracket for crop treatment nozzles is provided at the rear of the frame for vertical gauging and left and right relation to the crop row.

The discs provide a shallow shearing action when positioned with convex sides thereof toward the crop row, effectively removing weeds and grasses from the shoulder zone of the crop row and moving them into the spaces between the crop rows where they are subjected to mixing and cultivating by a sweep blade. The discs are rotatable 180° upon vertical shafts to provide a "dirting" action to cover small weeds and grasses in the crop row and the shoulder zones thereof.

The invention may be mounted on a separate tool bar and used independently of any other row crop operation, i.e., it may be used with or without spray treatment, with or without cultivation, or it may be used for spray only with the discs removed.

BRIEF DESCRIPTION OF THE DRAWINGS

FIG. 3 is a side elevational view taken substantially on line III—III of FIG. 2.

FIG. 4 is a schematic plan view from above of the layout of the tillage device together with adjacent cultivator units in a crop treatment pass along the crop row.

DESCRIPTION OF THE PREFERRED EMBODIMENTS

Figure 1:
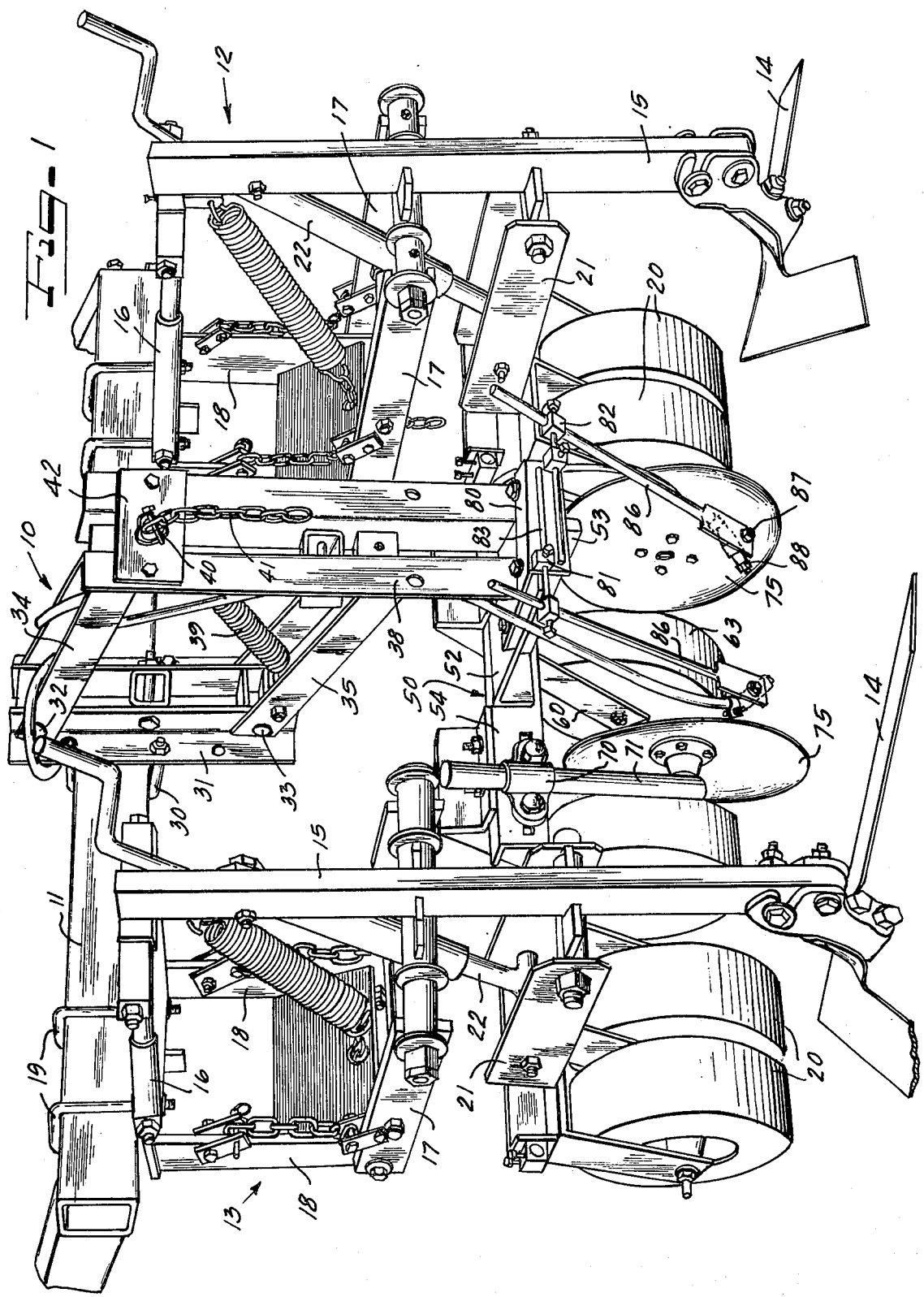
FIG. 1 is a perspective view from the left rear of the device of the invention mounted between two cultivator units upon a common tool bar.

The device of the present invention is shown generally at 10 in FIG. 1 mounted upon a tool bar 11 behind a propelling vehicle such as a tractor which draws the tool bar forwardly in a direction transverse to the longitudinal direction of the tool bar 11 may be used in conjunction and during the cultivation operation, or may be used in a separate operation independent of the cultivation or other row crop operation. As shown in FIG. 1, a pair of exemplary cultivator units 12 and 13 are mounted on the tool bar 11 on either side of the tillage unit 10. Each of the cultivator units 12 and 13 carries a sweep blade 14 on a lower end of a vertical shank 15. The shank 15 is movable vertically with respect to the tool bar 11 upon upper and lower parallel arm linkages 16, 17 which are pivotally connected at their forward ends to vertical bars 18 which form part of a rectangular front frame. This front frame is attached to the tool bar 11 by means of U-bolts 19. The link arms 16, 17 and 18 form with the upper part of the shank 15 a parallelogram assembly enabling vertical movement of the shank 15 and the sweep blade 14. The specific form of cultivator forms no part of the present invention since the inventive subject matter could be used with various other cultivators of similar operational capacity or utility.

In the exemplary cultivator illustrated, the shak 15 is gauged vertically by a pair of gauge wheels 20 which are carried on a frame 21 and a height adjustment arm 22 which connect together to form a triangle. The gauge wheel 20 follows the contour of local ground between crop rows, carrying the sweep blades 14 therebehind in a predetermined depth relation to the surface of the ground upon which the wheels 20 are guided.

In accordance with the invention, the tillage device 10 is mounted to the tool bar 11 by means of U-bolts 30 which are attached to a first, forward frame member 31 of the device 10 arranged vertically behind the tool bar 11. The forward frame member 31 carries upper and lower pivot pins 32, 33 which respectively connect dual upper and lower arms 34, 35 thereto. Each of arms 34, 35 comprise a pair of bars which are rigidly connected together to form a beam which is resistant to twisting under side loads applied to the bottom of the tillage unit. Rear ends of the links or arms 34, 35 are pivotally attached at pivot pins 36, 37 as shown in FIG. 3, to a second, rear frame member 38 which is arranged parallel to the first frame member 31. The forward and rear frame members 31, 38 and the upper and lower links 34, 35 thus form a parallelogram arrangement much like that employed on the cultivators 12, 13 enabling substantially vertical movement of the second frame member 38 with respect to the tool bar 11.

A tension spring 39 is connected between an upper part of the rear frame member 38 and a forward portion of the lower link arm 35 to provide a downward force upon the rear frame member 38 to avoid bouncing or lifting thereof. The tension of the spring 39 is adjustable by means of a pin 40 which is extended through any link of a chain 41 connected to the spring 39. The pre-tension force applied to the spring 39 depends on the length of the chain 41 withdrawn from a flat bracket 42 attached to the rear side of the rear frame member 38.

A horizontally-positioned T-shaped frame 50 is affixed rigidly to the bottom of the second, rear frame member 38 by bolts as shown in FIG. 3 extending between a base 51 integrally attached to the frame member 38 and a triangular, horizontal flange 52 of the T-bar frame 50. The T-bar frame 50 comprises a longitudinal bar 53 and a head portion 54 attached thereto, braced by the flange 52 and extending transversely to the direction of motion of the unit 10. Since the T-bar frame 50 is affixed perpendicularly to the rear frame member 38, it is maintained in a horizontal position despite up and down movements of the frame 38 upon the parallelogram linkage.

Figure 2:
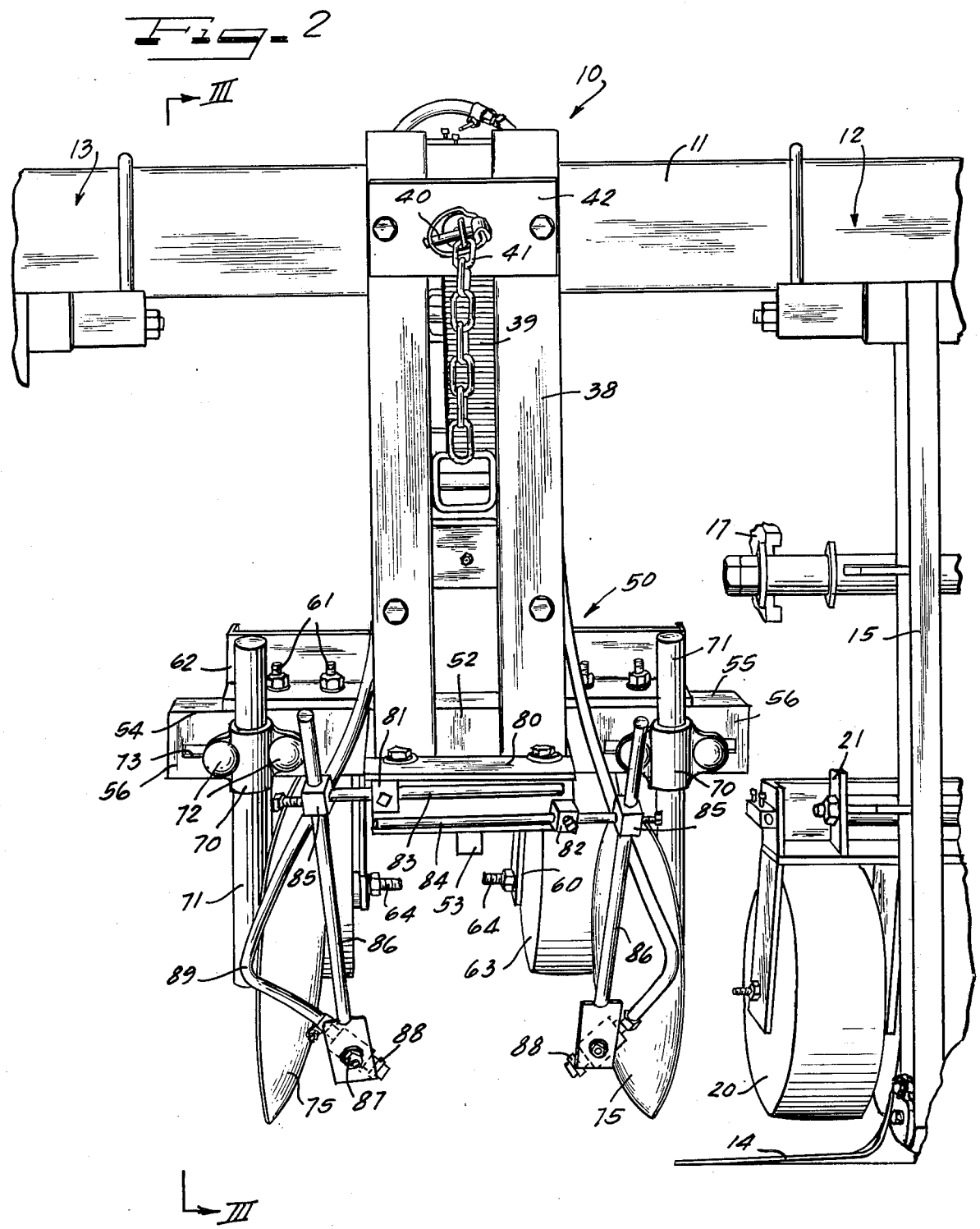
FIG. 2 is a perspective view of the device of the invention from the left center rear and an adjacent cultivator unit.

As best shown in side view in FIG. 3, the cross bar 54 of the T-frame 50 is formed by a piece of angle iron having a horizontal portion 55 and a vertical portion 56. Both portions of the cross bar 54 extend laterally of the parallelogram linkage of the device 10 to straddle a crop row, as shown in FIG. 2.

Carried upon the cross bar 54 laterally outwardly from the base bar 53 are a pair of gauge wheel yoke brackets 60. These brackets are affixed to the frame 50 at the upper portion 55 of the cross bar 54. The brackets 60 are laterally adjustable along the horizontal portion 55 upon bolts 61 connecting a mounting portion 62 of the wheel brackets 60 to the upper portion of the cross bar 54. Each pair of wheel yoke brackets extends downwardly and forwardly from the frame 50 to either side of a gauge wheel 63 and to an axle 64 upon which the wheel 63 is rotatable. The wheels 63 are broad in width to have a substantial bearing area upon the ground, thereby to maintain the horizontal frame 50 in a gauged relation to a varying local crop row shoulder contour 65.

Mounted upon the vertical flange 56 of the cross bar 54 of the T-frame 50 are a pair of clamp members 70, each of which is adapted to receive in adjustable vertical relation thereto a disc blade shaft member 71. As shown in FIGS. 1 and 2, each clamp member 70 is affixed to the vertical portion 56 of the cross bar 54 by a pair of bolts 72 which engage through a rectangular aperture 73 extending laterally on the vertical portion 56. Tightening of the bolts 72 clamps the shaft 71 in any desired vertical, laterally-spaced apart, and angular relation to the frame 50.

Disc blades 75 which in this disclosure are rotatable are mounted on the shafts 71 near lower ends thereof and transversely to the shafts 71 upon bearings to be freely rotatable as the tillage unit 10 is traversed along the ground surface 65. The disc blades 75 have a concave side, a convex side, and a sharp edge therebetween to cut through soil and plants fibers. The concave shape casts sweepings sidewardly as shown in FIG. 4 during forward motion of the unit 10. Since the disc blade edges are thin, the blades 75 provide substantially no ground support function but rather will slice through the ground to a depth determined by the vertical adjustment of the shaft 71 with respect to the frame 50, which is gauged above the ground surface 65 by the wheels 63.

Upon the rear of the T-frame 50, behind the rear frame member 38, is affixed a mounting bracket 80 having left and right rod mounting brackets 81, 82 for receiving rods 83, 84 which extend horizontally therefrom to either side of the frame member 38. Each of the rods 83, 84 carries on an outer end a second mounting bracket 85 which carries transversely to the horizontal rods a nozzle carrier rod 86. The carrier rods 86 each have a swivel clamp 87 at an expanded distal end which is engageable with a spray nozzle assembly 88. Each spray nozzle 88 is connected through a hose 89 to a source (not shown) of a fertilizer, weed treatment, or pest control chemical and carried either on the tractor or upon the tool bar 11. Each spray nozzle 88 is pivotable with respect to the axis of the pivot point 87, may be swiveled and raised with the rod 86, and may be pivoted about the rod 83 or 84 in the mounting bracket attachments 81, 82. Where desired, more than one pair of spray nozzles 88 may be employed from the bracket 80 to provide simultaneous fertilization and weed or pest control as may be desired. In some cases only one of the spray nozzles 88 may need to be employed, as where only light crop treatment is required. Since the spray nozzles 88 are carried by the frame 50, they are gauged to local crop row contours for efficient application of chemicals thereto.

In operation, the tillage assembly 10 will be mounted upon the tool bar 11 between two cultivator units 12, 13. The sweeps 14 of the cultivator units 12, 13, may be spaced apart laterally to cultivate soil in portions 90 shown in FIG. 4 between crop rows 91 which are planted on the row or drill areas 65. The blades 14 loosen soil and uproot weeds growing in the inter-row areas 90, allowing penetration of rain water and air to roots of the plants growing in the rows 91. As shown in FIG. 4, the sweeps 14 are preceded and gauged to ground contours in the areas 90 by the gauge wheels 20 mounted to the horizontal frames 21 of the units 12, 13. The tillage assembly 10 is mounted to the tool bar 11 midway between the cultivator units 12, 13, with the gauge wheels 63 and disc blades 75 and spray nozzles 88 straddling one of the crop rows 91 between the sweeps 14, 14. The gauge wheels 63 will ride along shoulders of the crop row or drill 65, with the disc blades 75 adjusted with the vertical shanks 71 thereof at the clamps 70 to sweep along the shoulder areas 92 at the intersections between the rows 65 and the inter-row areas 90, sweeping the shoulders clean of weeds 93 growing thereon and directing the weeds into the area swept by the cultivator blades 14.

Whenever necessary, the vertical shafts 71 carrying the disc blades 75 may be turned around upon their vertical shafts 71 through almost 180° so that the concave sides of the disc blades 75 are facing the crop row 91 to provide a "dirting" action to move soil onto the crop row 65 to cover low weeds and to raise the surface of the soil. Since the disc blade clamps 70 and the nozzle mounting bracket 80 are both accessible from the rear of the unit 10, such adjustment may be quickly effected even in the field as conditions warrant.

The invention of the present disclosure is not limited to the particular structure shown but may be utilized with various other cultivators and may be used independently of any cultivator or row crop operation.

It should be understood that I wish to embody within the scope of the patent warranted hereon all such modifications as reasonably and properly come within the scope of my contribution to the art.

I claim as my invention:

1. A row crop tillage and treating device adapted to be towed along a crop row by a towing means, said device comprising:
   a pair of spaced-apart, parallel frame members;
   a pair of parallel, spaced-apart link members pivotally joining said frame members and forming a parallelogram linkage therewith;
   a first one of said frame members being attachable to said towing means;
   a second one of said frame members comprising a mounting portion;
   a pair of transversely-spaced gauging wheels carried by said mounting portion, the wheels being spaced to straddle said crop row;
   a pair of shanks affixed vertically to said mounting portion on either side thereof to straddle said crop row;
   a disc blade carried by each of said shanks upon an axis transverse to said shank; and
   at least one crop treating device carried by said mounting portion and extending adjacent said crop row.

2. A row crop tillage and treating device as defined in claim 1, wherein each of said shanks is affixed to said mounting portion by adjustable clamp means permitting selective vertical, transverse, and angular positioning of said shank and said disc blades carried thereon.

3. A row crop tillage and treating device as defined in claim 1, wherein said frame members extend vertically and said second frame member trails behind said first frame member upon said link members.

4. A row crop tillage and treating device as defined in claim 1, wherein said mounting portion comprises a T-shaped bar having a transversely-extending cross-bar and a longitudinally-extending shank portion, and said gauge wheels and said shanks are mounted to said cross-bar.

5. A row crop tillage and treating device as defined in claim 4, wherein said crop-treating devices are mounted upon an adjustment bracket carried by said shank portion of said T-bar and extend adjacent said crop row and said disc blades.

6. A crop row surface-gauged tillage device adapted to travel along and to till row crops, comprising:
   a longitudinally-extending parallelogram linkage one side of which is engaged with a tool bar attached to a propulsion means and an opposite side of which carries surface gauging, discing, and spray nozzle means;
   said surface gauging means comprising a pair of transversely spaced-apart members to slide, skid or roll in tracking relationship along a crop row on shoulders thereof adjoining a crop;
   said discing means comprising a pair of transversely spaced-apart vertical shafts adjustably clamped to said parallelogram linkage and a pair of convex, sharp-edged disc blades each carried rotatably by and transversely to each of said shafts, each said disc blade being adapted to shear an edge of said raised crop row and pass dirt therefrom to one side thereof; and
   said spray nozzle means being connected to a source of crop treatment fluid and arranged to selectively spray said fluid upon a portion of said crop row with or without discing.

7. A tillage device as defined in claim 6, further comprising a rigid horizontal frame member carried by said opposite side of said linkage and wherein said gauge wheels are connected to a front portion of said rigid frame, said spray nozzle means to a rear portion thereof, and said discing means to an intermediate portion thereof.

8. A tillage device as defined in claim 6, wherein each said disc blade engages said crop row just behind a point of engagement of said crop row shoulders by said gauge wheels.

9. In combination, a cultivation and tillage apparatus adapted to be towed along one of a plurality of spaced-apart crop rows from a rigid, transversely-arranged tool bar, the apparatus comprising:
   a plurality of cultivator assemblies spaced apart laterally along said tool bar and attached thereto, each said cultivator assembly carrying at least one generally horizontal sweep blade connected to said tool bar by a parallelogram linkage allowing independent vertical movement of said sweep in response to vertical gauging by a fore-running gauge wheel; and
   a tillage and crop treatment apparatus carried on said tool bar at a point midway between said pair of cultivator assemblies, said tillage apparatus comprising:
      a horizontally-disposed, rigid mounting frame adapted to overlie a crop row,
      a pair of gauge wheels spaced apart across said crop row to straddle said crop and to ride upon a ground surface of said crop row to gauge said frame vertically of said ground,
      a pair of shanks extending vertically downwardly from said mounting frame, one on either side of said crop row,
      a pair of convex disc blades each rotatably mounted transversely upon a lower end of one of said shanks,
      at least one spray nozzle device adjustably carried by said mounting frame and extending downwardly therefrom to a point adjacent said crop row, and
      a parallelogram assembly linking said mounting frame to said tool bar,
   whereby said cultivator devices and said tillage and treatment apparatus are carried in fixed lateral relation to one another along a crop row but are free to move vertically independently of one another in gauged relation to ground conditions in the paths thereof.

10. The apparatus of claim 9, wherein said disc blades are carried longitudinally forwardly of said sweep blades and said points of location of said spray nozzle devices are intermediate said disc wheels and said sweep blades.

UNITED STATES PATENT AND TRADEMARK OFFICE
CERTIFICATE OF CORRECTION

PATENT NO. : 4,054,007
DATED : October 18, 1977
INVENTOR(S) : John O. Moore

It is certified that error appears in the above-identified patent and that said Letters Patent are hereby corrected as shown below:

Column 2, line 42, change "shak" to --shank--;

Column 3, line 63, change "plants" to --plant--;

Column 4, line 14, omit the word "a".

Signed and Sealed this

Fourteenth Day of March 1978

[SEAL]

Attest:

RUTH C. MASON
*Attesting Officer*

LUTRELLE F. PARKER
*Acting Commissioner of Patents and Trademarks*